United States Patent [19]  [11] 3,939,249
Huege  [45] Feb. 17, 1976

[54] PURIFICATION OF TALC

[75] Inventor: Fred R. Huege, Somerville, N.J.

[73] Assignee: Engelhard Minerals & Chemicals Corporation, Edison, N.J.

[22] Filed: Nov. 7, 1974

[21] Appl. No.: 521,763

[52] U.S. Cl. .................................. 423/178; 423/331
[51] Int. Cl.² ............................................ C01F 1/00
[58] Field of Search .......... 423/155, 178, 331, 264, 423/561; 75/6; 252/457

[56] References Cited
UNITED STATES PATENTS

| | | | |
|---|---|---|---|
| 2,504,357 | 4/1950 | Swallen | 252/457 |
| 3,172,755 | 3/1965 | Vian-Ortuno et al. | 75/6 |
| 3,709,680 | 1/1973 | Holmes et al. | 75/6 |
| 3,758,293 | 9/1973 | Viviani et al. | 75/6 |

FOREIGN PATENTS OR APPLICATIONS 1,125,038  10/1956  France

Primary Examiner—Oscar R. Vertiz
Assistant Examiner—Wayne A. Langel
Attorney, Agent, or Firm—Melvin C. Flint; Inez L. Moselle

[57] ABSTRACT

An arsenic sulfide mineral impurity, such as gersdoffite, is removed from talc by an oxidative leach treatment at a pH below 2.

7 Claims, No Drawings

PURIFICATION OF TALC

BACKGROUND OF THE INVENTION

1. Field of the Invention

This invention relates to a method for removing arsenic sulfide mineral impurities from talc and is especially directed to a wet process for removing small quantities of finely divided arsenic sulfide minerals from finely divided talc to produce high purity products.

Talc is a naturally occurring nonmetallic mineral which in theoretically pure form has the formula $H_2Mg_3(SiO_3)_4$, corresponding to $3MgO.4SiO_2.H_2O$. The mineral occurs in ores which usually contain varying quantities of accessory nonmetallic minerals such as tremolite, serpentine, magnesite, calcite and quartz. Some deposits also contain metallic impurities such as iron, nickel, bismuth and arsenic in the form of sulfides, frequently mixed sulfides. One of the largest domestic talc industries, located in Vermont, processes an ore in which the principal minerals are talc of the platy type and magnesite which occurs in the form of breunnerite (a magnesium iron carbonate). The accessory minerals are reported to include pyrite and pyrrhotite (iron sulfide minerals) as well as gersdorffite ($NiS_2.AsS_2$) and cobalt minerals.

For some important uses of talc, ore of suitable composition is merely ground and sized. Accessory minerals including metallic impurities are not removed. Talc used in other products such as paints must meet stringent specifications for purity, color, carbon dioxide content, oil absorption and fineness of grind. The production of such products may necessitate beneficiation of an ore to remove nonmetallic minerals. Carbonate minerals such as the magnesite in the Vermont ores is removed from the ore along with the bulk of accessory sulfide minerals by froth flotation. Especially stringent limitations are imposed by the Cosmetic, Toiletry and Fragrance Association (CTFA) for talc used in cosmetics. CTFA F1-1, Parts I-A and II specifies a maximum of 2 p.p.m. acid-soluble arsenic.

A limited amount of the talc that is processed into powdered products meets the standards established for the cosmetic industry. Domestic talc meeting the standards is in short supply. A factor in the shortage is that some available processed powdered talc products contain residual arsenic impurities in quantities which are small but are in excess of the maximum tolerable level. The arsenic, present as a complex sulfide, cannot be removed to a sufficient extent by conventional hydrometallurgical techniques or by gravity separation. Even flotation beneficiated talc products may contain too much arsenic to be acceptable by the cosmetic industry. Simple leaching of talc with various mineral acids, caustic solutions or even water may remove a limited amount of arsenic. However, only a portion of the arsenic is removed.

2. Prior Art

The use of hot nitric acid to solubilize metal sulfides which are insoluble or poorly soluble in common solvents is well known in analytical chemistry. A redox reaction is involved and the sulfide ion is reduced to elemental sulfur. Such a reaction has been used to decompose gersdorffite, forming arsenic acid and elemental sulfur. (J. J. Mellor, INORGANIC AND THEORETICAL CHEMISTRY, Vol. IX, page 310, 1947 Edition.) Mixtures of nitric and sulfuric acids are used by the metallurgical industry to dissolve a variety of metal sulfides or mixtures of sulfides. This combination of reagents has been recommended in a two-stage treatment for separating arsenical minerals from nickel and cobalt. Arsenic is precipitated as the crystallized oxide which is separated from solubilized nickel and/or cobalt. The process is described in French Pat. No. 1,125,038 to Borvali et al.

A well-known method for removing metallic impurities such as arsenic sulfides from silicate ores and minerals involves forming volatile metal chlorides. U.S. Pat. No. 2,504,357 to Swallen discloses such a process.

THE INVENTION

An object of the invention is to provide a commercially feasible method for purifying arsenic-contaminated talc by a technique which does not result in the destruction of the talc crystals or leave toxic residues therein. A specific object is to provide a method for reducing the acid-soluble arsenic level of arsenic-contaminated talc to a minimal value while leaving the talc in a state or condition satisfactory for use by the cosmetic industry and for other applications in which a low heavy metal content is desirable.

Briefly stated, the present invention comprises a method for reducing the arsenic level of talc contaminated with a small amount of one or more arsenic sulfide minerals such as gersdoffite by oxidative leaching of the arsenic from the talc, wherein the oxidant used has an oxidation potential ($E°$) greater than (larger negative value than) minus 1.0 volts and the talc pulp is maintained at a pH below 2 by addition of a strong acid during the oxidation treatment and until the pulp liquid containing the solubilized arsenic is removed from the solids in the pulp. Sulfur is oxidized to sulfate ion which is removed along with the solubilized arsenic in the leach liquor. Preferred oxidants are hydrogen peroxide and hypochlorite salts. A preferred acid for achieving and maintaining the desired pH below 2 is sulfuric acid.

The method of the invention differs from prior art methods for treating arsenical sulfide minerals with oxidants in the presence of hydrogen ions. In my process, arsenic and sulfur are dissolved and leached from an ore. Either arsenic oxide or elemental sulfur is precipitated in prior art techniques. Precipitated sulfur would be an undesirable contaminant in a cosmetic grade talc product. Precipitation of arsenic oxide would not achieve the desired results in my process.

DETAILED DESCRIPTION

The invention is applicable to the treatment of platy talcs containing one or more water-insoluble arsenic minerals, including complex arsenic minerals such as gersdorffite present as discrete particles and/or impurities. The process of the instant invention also removes any readily soluble arsenic impurities as well as carbonate mineral contaminants and flotation oil residues.

The talc is usually ground and partially purified by means such as tabling and/or flotation before undergoing the oxidation treatment. The partially processed talc feed for the oxidation treatment is usually finer than 325 mesh (44 microns).

As mentioned, an essential feature of the invention resides in using an oxidant having a potential higher (more negative) than −1.0 volts. (See W. M. Latimer, OXIDATION POTENTIALS, 2nd Edition, Prentice-Hall, Inc., 1952.)

Examples of suitable oxidants are: ozone, hydrogen peroxide and other soluble peroxides, chlorine, hypochlorites such as sodium hypochlorite, chlorate salts such as sodium and potassium chlorate, persulfate salts such as sodium persulfate, and combinations of the aforementioned. Alkali metal permanganate salts such as potassium may be used. However, treatment with permanganate is preferably followed by addition of a strong reducing agent such as a dithionite salt, for example sodium hydrosulfite, to reduce residual manganese to colorless state. Dichromate salts may also be employed. Hydrogen peroxide and hypochlorites are preferred oxidants for large-scale commercial applications. Ozone is highly effective and leaves no residues in the talc. I have found that a source of nitrate ions is unsuitable in my process since the arsenic content of talc is not reduced to the desired level using commercially practical temperatures and concentrations.

Suitable concentrations of oxidants are readily determined by simple routine experimentation. Using hydrogen peroxide, satisfactory results have been achieved at concentrations of 10 grams per liter or above.

An essential feature of the oxidant treatment is that the pulp of talc is maintained at a pH below 2 during the oxidation treatment and until the solubilized arsenic is removed from the pulp. A pH of about 1 has been used successfully. The preferred acid is sulfuric acid. Hydrochloric acid may be employed when corrosion-resistant equipment is available. Nitric acid should be avoided because of its known noxious and corrosive properties.

It is usually desirable to reduce the pH of the talc pulp to a value below 2 before incorporating the oxidant. When the talc contains carbonate impurities, the pH of the pulp will usually increase after acid and oxidant are incorporated. If the pH should increase to a value of 2 or above as a result of such reaction, additional acid must be added to maintain pH below 2, preferably in the range of 1.0 to 1.5, until arsenic is solubilized to the extent desired. When the talc is either free from carbonate impurities or contains extremely low levels of carbonate contaminants, the oxidant may be added before the acid or they may be incorporated simultaneously.

The oxidation treatment may be carried out at temperatures ranging from ambient to elevated temperatures up to the boiling point. Reaction times are usually in the range of 5 minutes to an hour and vary with the species of oxidant, arsenic content of the feed talc, and reaction temperature. Sufficient time is allowed for the desired solubilization of arsenic impurities to take place.

The solids of the talc slurry undergoing treatment is not critical. Sufficient water is present in the pulp to provide a pulp which is sufficiently fluid for agitation and handling. Suggested pulp solids are within the range of 10 to 40% by weight. Generally, as the talc content of the pulp increases the smaller the amount of oxidant required to achieve a satisfactory concentration. However, it should be noted that as solids concentration of the pulp is increased, it may be necessary to employ an oxidant such as hydrogen peroxide at somewhat higher concentration to achieve a desired reduction in arsenic level. This is attributable to impurities in the talc which catalyze decomposition of hydrogen peroxide.

Batch or continuous processing may be employed. Stagewise leaching is within the scope of the invention.

In practicing the embodiment of the invention wherein the talc is beneficiated by froth flotation before undergoing oxidation treatment, the float product (talc concentrate) from the flotation cells may be dewatered and washed before the oxidation treatment or these steps may be eliminated.. The method described in U.S. Pat. No. 3,459,299 to Mercade is useful in carrying out the flotation treatment.

After the oxidation treatment, the pulp of talc is dewatered by conventional means such as filtration or centrifugation to remove pulp liquid containing solubilized arsenic, sulfur and other impurities. The talc is washed one or more times, suitably with water having a low heavy metal content, to remove free acidity.

Reference is made to the following examples, which will serve to set forth embodiments of my invention as well as to point out additional features and advantages in connection therewith.

The talc used in the examples was a commercial platy talc product. The talc was produced by wet processing an ore from a Vermont deposit. The wet processing included beneficiation by flotation an aqueous medium, drying and fine milling. The product was essentially 100% finer than 325 mesh and had an average particle size of 2.7 microns.

Typical chemical analysis of the product is:

|  | Weight % |
| --- | --- |
| Magnesium (MgO) | 30.7 |
| Silica ($SiO_2$) | 58.2 |
| Calcium (CaO) | 0.3 |
| Iron ($Fe_2O_3$) | 3.4 |
| Aluminum ($Al_2O_3$) | 0.4 |
| Loss on Ignition | 6.9 |

Analysis of a representative sample of the talc product by the potassium bromide method indicated that total arsenic content was 67 p.p.m. Total nickel was 1169 p.p.m. and sulfur was 200 p.p.m. The arsenic soluble in hot water was 14 p.p.m.; nickel solubility was 13 p.p.m. and sulfur was 100 p.p.m. From solubility tests with a variety of reagents, it was concluded that the nonsoluble portion of the arsenic contamination was a nickel arsenic sulfide present as a discrete mineral or as a surface coating.

EXAMPLE I

The arsenic level of a sample of the talc product was reduced to 2.3 p.p.m. by oxidation with hydrogen peroxide at a pH of 1.0, using sulfuric acid to maintain pH at about 1.

In carrying out the test, the talc was slurried with water at 20% solids. The pH of the slurry was 9.1. Sulfuric acid was added to reduce pH to 1.0 and hydrogen peroxide, added as a 30% solution, was incorporated in amount corresponding to 75 lbs. $H_2O_2$/ton of talc. The slurry was stirred and aged in an open vessel at ambient temperature for 12 hours. The slurry was filtered and the filter cake was washed thoroughly with water and mildly dried.

EXAMPLE II

Other tests using hydrogen peroxide as the oxidant and sulfuric acid as the acidifying agent were carried out at elevated temperature (100°C.) for 10 minutes.

In one test, in accordance with our invention, the slurry of talc was acidified to pH 1.0 with sulfuric acid, followed by addition of hydrogen peroxide (150 lbs./ton). Total arsenic of the resulting product was 3.0 p.p.m. In another test, outside the scope of my invention, the slurry was acidified to pH 2.0, followed by addition of hydrogen peroxide (150 lbs./ton). After heating the slurry for 10 minutes, the pH of the talc slurry had increased to 7.6 and the total arsenic analysis of the product was 33.5 p.p.m. Thus, only half of the total arsenic was removed from the talc by this procedure. On the other hand, about 90% of the total arsenic was removed with the same oxidant under the same conditions of time and temperature when pH was maintained at about 1.

EXAMPLE III

This example illustrates the utility of ozone in removing arsenic from talc.

A 20% solids slurry of the talc was acidified to pH 1.1 by sulfuric acid. While the slurry was being agitated at ambient temperature with an impeller agitator, ozone was charged to the slurry, using the technique described in Example I of U.S. Pat. No. 3,616,900 to Cecil et al. Ozone was added at the rate of 1 liter per minute over a period of about 90 minutes. At the end of the ozone treatment pH was 1.4. The slurry was then filtered and washed with water. Using 30 lbs. $O_3$/ton talc, total arsenic of the product was 2.3.

To demonstrate the criticality of maintaining a pH below 2 during ozonation, the procedure was repeated with another portion of the 20% solids slurry of talc acidified to pH 2.0 before addition of ozone. After ozonation using 32 lbs. $O_3$/ton talc, the pH of the pulp was 2.7. The talc product obtained by filtering the ozone-treated slurry and washing the filter cake analyzed 34.3 p.p.m. total arsenic.

A comparison of the results obtained by maintaining pH below 2 with those realized at a pH allowed to rise above 2 in tests utilizing substantially the same amount of ozone shows that almost 20 times more arsenic was removed by maintaining pH below 2.

EXAMPLE IV

Example II was repeated using hydrochloric acid to acidify the pulp with a similar amount of hydrogen peroxide at a pH of 1.0. The total arsenic content of the purified product was 2.0 p.p.m.

EXAMPLE V

The arsenic level of another sample of the talc was reduced to 2.1 p.p.m. by adding 3M HCl to a 20% solids aqueous slurry of the talc, adding potassium chlorate in amount of 200 lbs./ton, heating for 10 minutes at 100°C. while maintaining pH at about 1.0 with hydrochloric acid, filtering and washing.

The foregoing examples show that total arsenic was reduced to about 2 p.p.m. by solubilizing the arsenic impurity with a variety of strong oxidizing agent in talc pulps maintained at pH values below 2. Since total arsenic was about 2 p.p.m., the maximum tolerable soluble arsenic specification of 2 p.p.m. was fully met in all of the tests in which the oxidation treatment was conducted at low pH.

I claim:

1. A method for removing an arsenic sulfide impurity from talc which comprises acidifying an aqueous pulp of said impure talc to a pH below 2 with an acid selected from the group consisting of sulfuric and hydrochloric, adding to said pulp an oxidizing agent having an oxidation potential with a greater negative value than −1.0 volts, maintaining the pH of said pulp below 2 until said impurity is dissolved therein, separating the talc from said pulp and washing the resulting purified talc product.

2. The method of claim 1 wherein the oxidant is selected from the group consisting of ozone, hydrogen peroxide, chlorine, hypochlorite salts, perchlorate salts and persulfate salts and sulfuric acid is used to acidify the pulp.

3. The method of claim 1 wherein the oxidant is hydrogen peroxide.

4. The method of claim 1 wherein the arsenic sulfide impurity is a complex arsenic-nickel-sulfide.

5. The method of claim 1 wherein said talc is in platy crystalline form.

6. The method of claim 1 wherein the pulp containing the oxidant is maintained at a pH below 2 for a time sufficient to reduce the acid soluble arsenic content to a value of about 2 p.p.m. or less.

7. The method of claim 1 wherein the impure talc contains carbonate minerals and after said oxidizing agent is incorporated, additional acid is added to maintain pH below 2.

* * * * *